3,297,705
Patented Jan. 10, 1967

3,297,705
3-AMINO TETRAHYDRO-2H-PYRAN-2-ONES
James C. Martin, Kingsport, Tenn., assignor to Eastman Kodak Company, Rochester, N.Y., a corporation of New Jersey
No Drawing. Filed Apr. 18, 1966, Ser. No. 543,020
16 Claims. (Cl. 260—294.3)

This application is a continuation-in-part of my copending application Serial No. 244,566, filed December 14, 1962, now abandoned.

This invention relates to novel organic compounds and to a novel method of preparation. More particularly, it relates to novel tetrahydro-2H-pyran-2-ones prepared by the cycloaddition of substituted ketenes with tertiary enamines.

It has heretofore been thought that ketenes and enamines undergo cycloaddition only in a 1:1 molar ratio yielding aminocyclobutanones (Hasek and Martin, J. Org. Chem., 26, 4775 [1961]; Berchtold et al., J. Org. Chem., 26, 4776 [1961]; Opitz et al., Angew. Chem., 73, 654 [1961]). Also reported by Hasek and Martin, J. Org. Chem., 28, 1468 (1963) was the 2:1 cycloaddition of substituted ketenes with tertiary enamines to afford 5-amino-1,3-cyclohexanediones. This work is incorrect; the compounds actually prepared were tetrahydro-2H-pyran-2-ones and not 5-amino-1,3-cyclohexanediones. We have now discovered that, contrary to prior experience with the 1:1 molar ratio of cycloaddition, substituted ketenes can be caused to react in a 2:1 cycloaddition with certain tertiary enamines by contacting the reactants in the presence of a solvent of high polarity, more particularly, an aprotic dipolar solvent having a dipole moment greater than 2.0 debye units. The resulting products are novel tetrahydro-2H-pyran-2-ones.

The novel cycloaddition reaction and tetrahydropyranone products of the invention can be represented by the following equation:

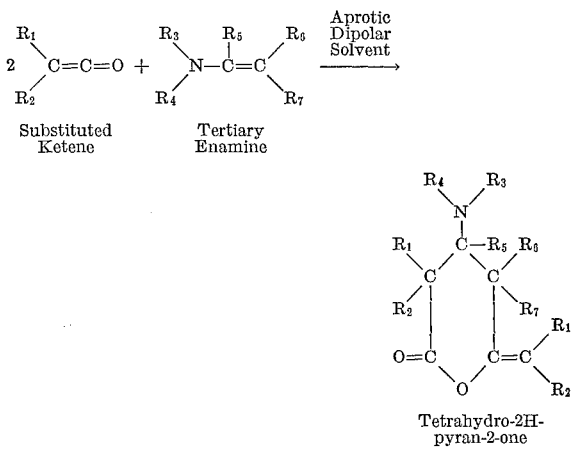

Tetrahydro-2H-pyran-2-one

The process of the invention can employ broad classes of enamines and substituted ketenes. We have found that in general any compounds having the characteristic substituted ketene functional group,

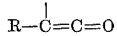

and any compound having the characteristic tertiary enamine functional group

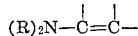

which compounds are free of substituents that would preclude the 2:1 ketene-enamine cycloaddition, will in the presence of a type of solvent of high polarity yield a tetrahydro-2H-pyran-2-one of the type above indicated.

The substituted ketene can be an aldoketene or a ketoketene and, accordingly, one of the substituents $R^1$ or $R^2$ can be hydrogen. However, simple ketene is not operable in the process, so at least one of the substituents $R^1$ or $R^2$ must be an organic radical. In other words, the ketene must have no more than one α-hydrogen atom.

The substituents, $R^1$ and $R^2$ of the ketene can be selected from a broad class of monovalent or bivalent organic radicals having from 1 to about 18 carbon atoms. These can include, for example, such monovalent organic radicals as: alkyl and cycloalkyl, particularly $C_1$–$C_8$ alkyl (preferably, lower alkyl), cyclopentyl and cyclohexyl; aryl, particularly phenyl and lower alkyl- or lower alkoxy-substituted phenyl; thienyl; alkenyl, particularly lower alkenyl; and carbalkoxy, particularly wherein the alkoxy radical thereof has 1 to 8 carbon atoms. $R^1$ and $R^2$ can also be joined bivalent organic radicals that form a cyclic radical with the carbon to which they are attached. For instance, $R^1$ and $R^2$ can be lower alkylene radicals joined to form a saturated carbocyclic ring. In addition, $R^1$ and $R^2$ can be groups containing carbon, hydrogen and oxygen atoms which with the carbon atoms to which they are attached, form a heterocyclic ring having 4 to 5 carbon atoms and an oxygen atom in the ring, such as the radicals derived from dihydropyrans, dihydrofurans, tetrahydrofurans, and tetrahydropyrans.

In the preferred embodiments of the invention, $R^1$ and $R^2$ are saturated hydrocarbon radicals of 1 to about 8 carbon atoms, e.g., lower alkyl radicals or joined lower alkylene radicals, the latter forming a ring, e.g., cyclopentyl or cyclohexyl, with the carbon atom to which they are attached.

The process of the invention also applies to a broad class of enamines and in its broadest aspect this class comprises tertiary amines having an α,β-olefinically unsaturated substituent. $R^3$ and $R^4$ of the enamines can be the same or different monovalent radicals of the types discussed above with regards to $R^1$ and $R^2$. $R^3$ and $R^4$ can also be joined bivalent radicals which, with the nitrogen to which they are attached, form a heterocyclic radical such as pyrrolidino, piperidino, morpholino or such heterocyclic radicals having substituents such as lower alkyl, lower alkoxy or lower thioalkyl.

One important characteristic of the enamines for satisfactory 2:1 cycloaddition in accordance with the present invention is that the substituent $R^5$ must be either hydrogen or a saturated monovalent organic radical free of labile hydrogen atoms and the atom by which the radical is connected to the enamine must be carbon. In other words, unless $R^5$ is hydrogen, there must be a carbon-carbon bond between the substituent $R^5$ and the α-carbon atom of the enamine. Preferably, $R^5$ is hydrogen but other suitable substituents $R^5$ include: alkyl, preferably lower alkyl; cycloalkyl, preferably cyclopentyl or cyclohexyl; and mononuclear aryl, including lower alkyl- or lower alkoxy-substituted phenyl.

The substituents $R^6$ and $R^7$ can be hydrogen or monovalent or bivalent organic radicals of the same types discussed above with regard to $R^1$ and $R^2$. Although in the broadest aspects of the invention one or both of the substituents $R^6$ and $R^7$ can be hydrogen, the resulting products when either $R^6$ or $R^7$ is hydrogen are not thermally stable. Accordingly, in the preferred embodiments of the invention $R^6$ and $R^7$ are both monovalent or bivalent organic radicals of the types indicated and, most preferably, are saturated hydrocarbon radicals of 1 to about 8 carbon atoms, e.g., lower alkyl radicals or joined lower alkylene radicals, the latter forming a ring, e.g., cyclopentyl or cyclohexyl, with the carbon atom to which they are attached.

Typical examples of suitable substituted ketenes of the types described include: methylketene, ethylketene, n- propylketene, isopropylketene, n-butylketene, isobutylketene, phenylketene, dimethylketene, ethylmethylketene, diethylketene, n-butylethylketene, di-n-propylketene, diisobutylketene, di-n-butylketene, di-n-heptylketene, ethyldodecylketene, dioctadecylkeene, camphoketene, dibenzylketene, ditolylketene, diallylketene, dicarbethoxyketene, tetramethyleneketene, pentamethyleneketene, diphenylketene, methylphenylketene, allylmethylketene, methylcarbethoxyketene, ethylcarbethoxyketene, n-propylcarbomethoxyketene, and the like.

Of the suitable enamines that have been described above, the preferred type comprises those having no β-hydrogen atoms, i.e., $R^6$ and $R^7$ are both organic radicals. Such enamines can be prepared by reacting an aldehyde having one α-hydrogen atom with a secondary amine. Typical enamines of this typpe include: N,N-dimethylisobutenylamine, N,N-diethylisobutenylamine, N,N-dibutylisobutenylamine, N-isobutenylpiperidino, N-isobutenylpyrrolidino, N,N-dimethyl-2-methylbutenylamine, N-(2-methylbutenyl)piperidine, N,N - dimethyl - 2 ethylbutenylamine, N-(2-ethylbutenyl)piperidine, N-(methylenecyclohexyl)dimethylamine, N-(methylenecyclohexyl)piperidine, N-isobutenylmorpholino, N-(2-ethylhexenyl)morpholine, N-(2-ethylhexenyl)piperidine, N,N-dimethyl-2-ethylhexenylamine, 3 - isobutenyl - 3 - azabicyclo[3.2.2]-nonane, 5-dimethylaminomethylene-2-norbornene, 2-diisopropylaminomethylene - 2 - (2,3 - dihydro - 4H - pyran), 2-(2-dimethylamino-1-ethylvinyl)thiophene, 2-dimethylamino-1,1-diphenylethylene, and the like.

Another type of enamine that can be used in the process of the invention is the type having at least one hydrogen atom on the β-carbon atom. Enamines of this type can be prepared by reacting a secondary amine with an aldehyde having at least two α-hydrogen atoms. Examples of such secondary amines include: simple dialkylamines such as dimethylamine, diethylamine, dibutylamine; heterocyclic secondary amines such as pyrrolidine, piperidine, morpholine, piperazine and 1-methylpiperazine; and secondary aromatic amines such as N-methylaniline. Typical aldehydes having at least two α-hydrogen atoms include: propionaldehyde, butyraldehyde, valeraldehyde, heptaldehyde, acetaldehyde, phenylacetaldehyde, etc. Examples of a few of the resulting enamines having at least one β-hydrogen atom obtained by the reaction of such secondary amines and aldehydes include: N-(1-butenyl(piperidine, N,N-dimethylvinylamine, N,N-dimethylpropenylamine, N-(1-butenyl)pyrrolidine, N,N-dimethyl-1-butenylamine, N,N-dibutyl-1-butenylamine, N-(1-heptenyl)morpholine, and the like.

Although the reactions employing any of the types of ketenes and enamines discussed above and the novel compounds having the tetrahydropyranone structure obtained by such reactions are within the scope of the invention, there are significant differences between certain classes of the reactants and products. Thus, when the process of the invention employs a ketoketene, such as dialkylketene, and an enamine having no β-hydrogen atoms, i.e., an enamine prepared from aldehydes having one α-hydrogen atom, the resulting product is a substituted tetrahydropyranone having no hydrogen atoms on the carbon atom adjacent to the carbonyl group. In other words, all of the substituents $R^1$, $R^2$, $R^6$ and $R^7$ are organic radicals. Compounds of this type have superior thermal stability.

When the reaction is carried out with a ketene having one α-hydrogen atom or an enamine having at least one β-hydrogen atom, the resulting substituted tetrahydropyranone product of the invention has at least one hydrogen atom on a carbon adjacent to the carbonyl group. In other words, at least one of the substituents, $R^1$, $R^2$, $R^6$ or $R^7$ is a hydrogen atom. Compounds of this type are useful new compounds but are not so stable thermally as the other cyclic compounds of the invention. In other words to obtain such compounds in satisfactory yield, the reaction of the ketene and the enamine must be carried out at a temperature below about 50° C., preferably below about 10° C., and to avoid decomposition, the products must not be heated above about 50° C. for any substantial length of time.

As a general rule the thermal stability of the cyclic compounds of the invention increases with an increase in the size of the alkyl substituents on the carbon atoms adjacent to the carbonyl group. For example, a compound of the invention in which the substituents $R^1$, $R^2$, $R^6$ and $R^7$ are methyl groups is less stable thermally than a compound otherwise identical in structure but in which $R^1$, $R^2$, $R^6$ and $R^7$ are butyl groups. This principle will influence the choice of a particular temperature below about 50° C. for preparing any specific compound in the class of the less stable compounds of the invention.

The reaction of the enamine and ketene is achieved by mixing the reactants in a highly polar solvent and the resulting tetrahydropyranone is isolated and purified by distillation or recrystallization. The use of a highly polar solvent is a critical feature of the invention and is described in more detail hereinafter. Although the ketene and enamine react in a 2:1 molar ratio the molar ratio of the reactants in the reaction mixture is not critical. We have found that the 2:1 cycloaddition occurs in the presence of a highly polar solvent regardless of which reactant is present in excess. However, the ketene should be added to the solution of enamine. If the reverse method of addition is employed with certain ketenes, e.g., dimethylketene, the ketene will polymerize.

Reaction temperatures in the range of about −80° C. to 200° C. can be employed although reaction temperatures of about 0° C. to 100° C. are preferred and room temperature is often satisfactory. However, if the ketene has an α-hydrogen atom or if the enamine has a β-hydrogen atom the reaction temperature must be maintained below about 50° C. in order to obtain the tetrahydropyranone product of the invention. The optimum reaction temperature varies with such factors as the thermal stability of the desired product and the reactivities of the enamine and the ketene, the higher temperatures being preferred for the higher molecular weight reactants. The reaction time can vary considerably, e.g., from a few minutes to one or more days. The reaction time is influenced by such variables as temperature and the reactivity of the reactants.

The process of the invention is based on the discovery that the 2:1 cycloaddition of the ketene and enamine occurs when the reaction is carried out in a certain type of highly polar solvent. Solvents of low to medium polarity produce cyclobutanones of the types disclosed in my co-pending application Serial No. 112,789, filed May 26, 1961, now U.S. Patent 3,189,608. The highly polar solvent of the type used in the present process unexpectedly yields the tetrahydropyranones, together with some of the cyclobutanones.

The solvent for the process of the present invention is an aprotic dipolar solvent which has a dipole moment greater than 2.0 Debye units. The preferred solvents have a dipole moment of at least 3.7 Debye units. Examples of solvents of the type defined include: dimethylformamide, dimethylacetamide, acetronitrile, propionitrile, butyronitrile, tetrahydrothiophene-1,1-dioxide (commonly known as Sulfolane), propylene carbonate, ethylene carbonate, methyl isoamyl ketone, nitromethane, nitroethane, nitrobenzene, and the like. Further examples of suitable dipolar aprotic solvents are disclosed in the review by A. J. Parker, Quarterly Reviews, 16, 163 (1962). This review defines "dipolar aprotic solvents" and distinguishes them from hydrogen donors, e.g., water, methanol and formamide, which are classed as protic solvents. It should be understood that the solvent for the process of the invention must dissolve both the enamine and the ketene and must be substantially inert, i.e., it should not react with the reactants or the products to any substantial extent within the time required for the desired reaction of the enamine and ketene.

The following examples illustrate the method and novel compounds of the invention.

Example 1

To a stirred solution of 297 g. (3.0 moles) of N,N-dimethylisobutenylamine in 700 ml. of acetonitrile was added 210 g. (3.0 moles) of dimethylketene. The exothermic reaction was kept at a temperature of 30–40° by an ice bath. After stirring for several hours at room temperature, the solvent was evaporated on a steam bath. The residue, which weighed 374.3 g., was taken up in dilute hydrochloric acid and extracted with ether. The aqueous layer was made alkaline with sodium hydroxide and the resulting organic layer was taken up in ether and dried over anhydrous magnesium sulfate. Distillation through a 12-in. packed column gave a quantity of 3-dimethylamino - 2,2,4,4 - tetramethylcyclobutanone and 115.1 g. of 4-dimethylamino-6-isopropylidene-3,3,5,5-tetramethyltetrahydro-2H-pyran-2-one, B.P. 132–134° (4 mm.), $n^{20}_D$ 1.4948.

*Anal.*—Calcd. for $C_{14}H_{25}NO_2$: C, 70.4; H, 10.5; N, 5.8; mol. wt., 239. Found C, 70.8; H, 10.8; N, 5.8; mol. wt., 244.

The black residue from the above distillation was extracted with 200 ml. of hot acetone. Evaporation of the acetone yielded 27.5 g. of solid residue. This material was recrystallized once from ethanol and once from toluene to give 19.4 g. of material, M.P. 168–169°. The elemental analysis shows that this compound is a combination of three molecules of dimethylketene and one molecule of N,N-dimethylisobutenylamine.

*Anal.*—Calcd. for $C_{18}H_{31}N_3$: C, 69.9; H, 10.1; N, 4.6; mol. wt., 309. Found: C, 70.1; H, 10.5; N, 4.6; mol. wt., 318.

Example 2

To a stirred solution of 198 g. (2.0 moles) of N,N-dimethylisobutenylamine in 600 ml. of acetonitrile was added 400 g. (4.1 moles) of diethylketene. The reaction solution was allowed to stand for two days at room temperature. After evaporating the low boilers on a steam bath, the resiue was added to dilute hydrochloric acid, and the insoluble portion taken up in ether. The aqueous layer was made alkaline with sodium hydroxide and the resulting organic layer was taken up in ether and dried over anhydrous magnesium sulfate. Distillation through a 10-in. packed column gave a large amount of 3-dimethylamino-2,2-diethyl-4,4-dimethylcyclobutanone and 68.0 g. of 4-dimethylamino-3,3-diethyl-6-(diethylmethylene)-5,5-dimethyltetrahydro-2H-pyran-2-one, B.P. 130–133° (0.8 mm.), $n^{20}_D$ 1.4950.

*Anal.*—Calcd. for $C_{18}H_{33}NO_2$: C, 73.2; H, 11.2. Found C, 72.9; H, 11.0.

Example 3

To a stirred solution of 280 g. (2.0 moles) of N-isobutenylpiperidine in 500 ml. of dimethylformamide was added 280 g. (4.0 moles) of dimethylketene. The exothermic reaction was kept at 40–50° by an ice bath. After stirring for 6 hours, the reaction mixture was distilled through a 10-in. packed column to give 2,2,4,4-tetramethyl-3-piperidino cyclobutanone and 180.4 g. of 6-isopropylidene - 3,3,5,5 - tetramethyl - 4 - piperidinotetrahydro-2H-pyran-2-one, B.P. 134–136° (1.2 mm.), $n^{20}_D$ 1.5090.

*Anal.*—Calcd. for $C_{17}H_{29}NO_2$: C, 73.2; H, 10.4; N, 5.0; mol. wt., 279. Found: C, 73.0; H, 10.4; N, 4.7; mol. wt., 280.

During the above distillation, a large amount of solid precipitated in the still pot. This was removed by filtration and recrystallized from toluene to give 51.3 g., M.P. 216.5–217.5°. The elemental analysis shows that this compound results from a combination of three molecules of dimethylketene and one molecule of N-isobutenylpiperidine.

*Anal.*—Calcd. for $C_{21}H_{33}NO_3$: C, 72.2; H, 10.0; mol. wt., 349. Found: C, 72.0; H, 10.2; mol. wt. 345.

Example 4

Using the same general conditions described in Example 1, to 49.5 g. (0.5 mole) of N,N-dimethylisobutenylamine in 400 ml. of acetonitrile at 80° C. was added 126 g. (1 mole) of butylethylketene, to give 4-dimethylamino-3-butyl - 3 - ethyl - 6 - (butylethylmethylene) - 5,5 - dimethyltetrahydra-2H-pyran-2-one.

The compounds of the invention are useful as fuel oil additives. For instance, they can be added to petroleum fuel oils in amounts, e.g., of about 0.001 to about 1 weight percent to inhibit sludge formation. They also have physiological activity and are useful in pharmaceutical research for testing as analgesics and as intermediates in the preparation of compounds having pharmaceutical activity. Still further, they are useful in the preparation of novel tertiaryamino-cyclohexanediols, the latter being useful as intermediates in the preparation of high molecular weight polymers which in turn are useful in the manufacture of textile fibers, films and molded objects.

The diols are prepared from the tetrahydro-2H-pyran-2-ones by reduction with alkali metal hydrides such as sodium borohydride, lithium hydride, lithium aluminum hydride, etc. These diols actually result from the rearrangement of the tetrahydropyranones to the 1,3-cyclohexanediones by the use of basic reagents and the resulting cyclohexanediones are reduced to the diols.

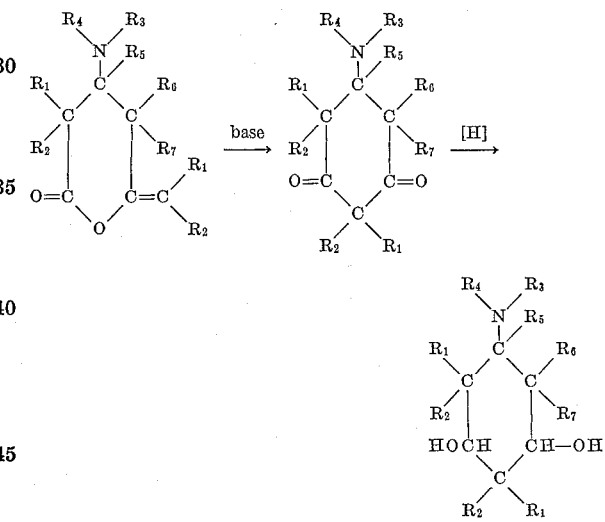

The tetrahydropyranones can be converted into the 1,3-cyclohexanediones by the use of anhydrous bases, such as sodium methoxide. The preparation of these diones is illustrated by the following example:

A mixture of 20 g. of 4-dimethylamino-6-isopropylidene-3,3,5,5-tetramethyltetrahydro-2H-pyran-2-one and 2 g. of sodium methoxide in 100 ml. of toluene was refluxed for 8 hrs. The reaction mixture was filtered and examination of the filtrate by infrared spectoscopy and gas liquid chromatography showed the absence of starting material and a new substance present in high yield. The new compound was subsequently identified as 5-dimethylamino-2,2,4,4,6,6-hexamethyl-1,3-cyclohexanedione.

The diols prepared from the novel tetrahydropyranones can be used to prepare various linear polymers having valuable properties. For instance they can be reacted with dicarboxylic acids to form polyesters, with phosgene or diarylcarbonates to form polycarbonates, or with diisocyanates to form polyurethanes. The polymers formed from these diols have tertiary-amino substituents which made the polymers hydrophilic. Consequently, with fibers made from the polymers the problem of static electrical charge is reduced and the fibers are dyeable by acid dyes of the types suitable for wool. Furthermore, the diols of which all of the ring substituents $R^1$, $R^2$, $R^6$ and $R^7$ are organic radicals form esters that are characterized by good hydrolytic and thermal stability. In addition to manufacture of polymers the cyclohexanediols are useful as sludge inhibitors for petroleum fuel oil.

The invention has been described in considerable detail with particular reference to certain preferred embodiments thereof, but it will be understood that variations and modifications can be effected within the spirit and scope of the invention as described hereinabove, and as defined in the appended claims.

I claim:
1. A compound of the formula:

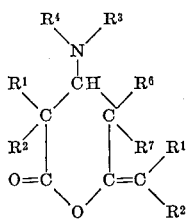

wherein $R^1$, $R^2$, $R^3$, $R^4$, $R^6$ and $R^7$, taken singly, are $C_1$–$C_8$ alkyl; $R^1$ and $R^2$, taken collectively, and $R^6$ and $R^7$, taken collectively, are lower alkylene which form a 5 to 6 membered saturated carbocyclic ring with the carbon atom to which they are attached; and $R^3$ and $R^4$, taken collectively, with the nitrogen atom to which they are attached form a pyrrolidinyl, piperidino or morpholino ring.

2. A compound according to claim 1 wherein $R^1$, $R^2$, $R^3$, $R^4$, $R^6$ and $R^7$ are $C_1$–$C_8$ alkyl.

3. A compound according to claim 1 wherein $R^1$ and $R^2$ are lower alkylene which form a 5 to 6 membered saturated carbocyclic ring with the carbon atom to which they are attached and $R^3$, $R^4$, $R^6$ and $R^7$ are $C_1$–$C_8$ alkyl.

4. The compound according to claim 1 in which $R^1$ and $R^2$, taken collectively, are lower alkylene which form a 5 to 6 membered saturated carbocyclic ring with the carbon atom to which they are attached; $R^3$ and $R^4$, taken collectively with the nitrogen atom to which they are attached, form a pyrrolidinyl, piperidino or morpholino ring; and $R^6$ and $R^7$ are $C_1$–$C_8$ alkyl.

5. A compound according to claim 1 in which $R^1$, $R^2$, $R^6$ and $R^7$ are $C_1$–$C_8$ alkyl and $R^3$ and $R^4$, taken collectively with the nitrogen atom to which they are attached, form a pyrrolidinyl, piperidino or morpholino ring.

6. A compound according to claim 1, 4-dimethylamino-6-isopropylidene-3,3,5,5-tetramethyltetrahydro-2H-pyran-2-one.

7. A compound according to claim 1 4-dimethylamino-3,3-diethyl-6-(diethylmethylene)-5,5-dimethyltetrahydro-2H-pyran-2-one.

8. A compound according to claim 1, 6-isopropylidene-3,3,5,5-tetramethyl-4-piperidinotetrahydro-2H-pyran-2-one.

9. A compound according to claim 1, 4-dimethylamino-3-butyl-3-ethyl-6-(butylethylmethylene)-5,5-dimethyltetrahydro-2H-pyran-2-one.

10. A method of preparing a compound of the formula:

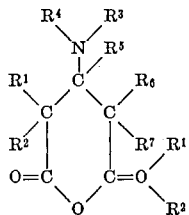

which comprises contacting a ketene of the formula, $R^1R^2C=C=O$, with an enamine of the formula,

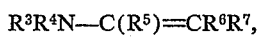

$R^3R^4N—C(R^5)=CR^6R^7$, in an aprotic dipolar solvent having a dipole moment greater than 2.0 Debye units; wherein $R^1$ and $R^2$ are selected from the group consisting of (a) hydrogen (b) $C_1$–$C_8$ alkyl and (c) joined lower alkylene groups which form a 5 to 6 membered saturated carbocyclic ring with the carbon atom to which they are attached, and when one of $R^1$ or $R^2$ is hydrogen the other is $C_1$–$C_8$ alkyl; $R_3$ and $R^4$, taken singly, are $C_1$–$C_8$ alkyl and, taken collectively with the nitrogen atom to which they are attached, form a pyrrolidinyl, piperdino or morpholino ring; $R^5$ is hydrogen or $C_1$–$C_8$ alkyl; and $R^6$ and $R^7$ are selected from the same group as $R^1$ and $R^2$.

11. The method according to claim 10 of preparing a compound of the formula:

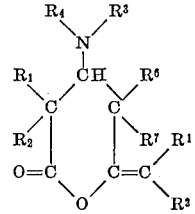

which comprises adding a ketene of the formula,

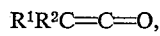

$R^1R^2C=C=O$, to a solution of an enamine of the formula,

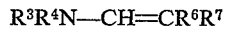

$R^3R^4N—CH=CR^6R^7$ in an aprotic dipolar solvent having a dipole moment greater than 3.7 Debye units, at a temperature of 0° C. to 100° C.; wherein $R^1$, $R^2$, $R^3$, $R^4$, $R^6$ and $R^7$ are $C_1$–$C_8$ alkyl.

12. The method according to claim 10 wherein said ketene is added to a solution of said enamine in said solvent.

13. The method according to claim 10 for preparing 4-dimethylamino-6-isopropylidene-3,3,5,5-tetramethyltetrahydro-2H-pyran-2-one which comprises adding dimethylketene to a solution of N,N-dimethylisobutenylamine in a dipolar aprotic solvent having a dipole moment greater than 3.7 Debye units at a temperature of 0° to 100° C.

14. The method according to claim 10 for preparing 4-dimethylamino-3,3-diethyl-6-(diethylmethylene)-5,5-dimethyltetrahydro-2H-pyran-2-one which comprises adding diethylketene to a solution of N,N-dimethylisobutenylamine in a dipolar aprotic solvent having a dipole moment greater than 3.7 Debye units at a temperature of 0° to 100° C.

15. The method according to claim 10 for preparing 6-isopropylidene-3,3,5,5-tetramethyl-4-piperidinotetrahydro-2H-pyran-2-one which comprises adding dimethylketene to a solution of N-isobutenylpiperidine in a dipolar aprotic solvent having a dipole moment greater than 3.7 Debye units at a temperature of 0° to 100° C.

16. The method according to claim 10 for preparing 4-dimethylamino-3-butyl-3-ethyl-6-(butylethylmethylene)-5,5-dimethyltetrahydro-2H-pyran-2-one which comprises adding butylethylketene to a solution of N,N-dimethylisobutenylamine in a dipolar aprotic solvent having a dipole moment greater than 3.7 Debye units at a temperature of 0° to 100° C.

No references cited.

WALTER A. MODANCE, *Primary Examiner.*

AVROM D. SPEVACK, *Assistant Examiner.*